United States Patent
Sako et al.

(10) Patent No.: US 10,587,567 B2
(45) Date of Patent: *Mar. 10, 2020

(54) COMMUNICATION METHOD AND APPARATUS

(71) Applicant: Sony Corporation, Tokyo (JP)

(72) Inventors: Yoichiro Sako, Tokyo (JP); Mitsuru Takehara, Tokyo (JP); Toshiro Terauchi, Tokyo (JP); Makoto Inoue, Tokyo (JP); Motoyuki Takai, Tokyo (JP); Masamichi Asukai, Kanagawa (JP); Katsuya Shirai, Kanagawa (JP); Takatoshi Nakamura, Kanagawa (JP); Toru Sasaki, Tokyo (JP); Yuichi Sakai, Kanagawa (JP); Masafumi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,455

(22) Filed: Apr. 9, 2019

(65) Prior Publication Data

US 2019/0238496 A1    Aug. 1, 2019

Related U.S. Application Data

(60) Continuation of application No. 15/293,400, filed on Oct. 14, 2016, now Pat. No. 10,291,577, which is a (Continued)

(30) Foreign Application Priority Data

Oct. 17, 2005    (JP) .................. 2005-301720

(51) Int. Cl.
*H04L 12/58*    (2006.01)
*H04M 1/725*    (2006.01)
(Continued)

(52) U.S. Cl.
CPC .............. *H04L 51/38* (2013.01); *H04L 51/32* (2013.01); *H04L 67/306* (2013.01);
(Continued)

(58) Field of Classification Search
USPC ....... 379/29.09, 88.11, 88.21, 93.23, 142.01, 379/142.06
See application file for complete search history.

(56) References Cited

U.S. PATENT DOCUMENTS 6,020,810 A    2/2000 Har-Even
6,968,179 B1*  11/2005 De Vries ............. H04L 12/5895
                                                    455/414.1
(Continued)

FOREIGN PATENT DOCUMENTS

DE    198 15 924 A1    10/1999
DE    199 29 186 A1    12/2000
(Continued)

OTHER PUBLICATIONS

U.S. Appl. No. 11/540,696, filed Sep. 29, 2006, Sako et al.
(Continued)

*Primary Examiner* — Yosef K Laekemariam
(74) *Attorney, Agent, or Firm* — Wolf, Greenfield & Sacks, P.C.

(57) ABSTRACT

A communication method includes the steps of transmitting, by means of a first communication apparatus, personal information to a second communication apparatus; receiving, by means of the second communication apparatus, the personal information and searching, by means of the second communication apparatus, whether or not personal information having the same content as the received personal information exists in the second communication apparatus;

(Continued)

and notifying, by means of the second communication apparatus, the first communication apparatus of a search result.

33 Claims, 8 Drawing Sheets

Related U.S. Application Data continuation of application No. 15/094,935, filed on Apr. 8, 2016, now Pat. No. 9,596,581, which is a continuation of application No. 14/572,678, filed on Dec. 16, 2014, now Pat. No. 9,326,130, which is a division of application No. 11/540,696, filed on Sep. 29, 2006, now Pat. No. 9,338,644.

(51) Int. Cl.
*H04W 4/21* (2018.01)
*H04M 1/2745* (2020.01)
*H04L 29/08* (2006.01)
*H04W 8/24* (2009.01)
*H04W 4/12* (2009.01)

(52) U.S. Cl.
CPC ... *H04M 1/274516* (2013.01); *H04M 1/7253* (2013.01); *H04M 1/72569* (2013.01); *H04W 4/12* (2013.01); *H04W 4/21* (2018.02); *H04W 8/24* (2013.01); *H04M 1/2745* (2013.01); *H04M 1/72552* (2013.01)

(56) References Cited

U.S. PATENT DOCUMENTS

| | | | |
|---|---|---|---|
| 7,877,082 B2 | 1/2011 | Eagle et al. | |
| 8,019,692 B2* | 9/2011 | Rosen | G06Q 30/02 705/319 |
| 9,326,130 B2 | 4/2016 | Sako et al. | |
| 9,338,644 B2 | 5/2016 | Sako et al. | |
| 9,596,581 B2 | 3/2017 | Sako et al. | |
| 2004/0181517 A1 | 9/2004 | Jung et al. | |
| 2004/0203363 A1 | 10/2004 | Carlton et al. | |
| 2005/0083907 A1 | 4/2005 | Fishler | |
| 2006/0064739 A1* | 3/2006 | Guthrie | H04L 41/0686 726/3 |
| 2006/0247940 A1 | 11/2006 | Zhu et al. | |
| 2007/0067297 A1 | 3/2007 | Kublickis | |
| 2007/0121826 A1 | 5/2007 | Sako et al. | |
| 2007/0208747 A1 | 9/2007 | Puckrin | |
| 2015/0106450 A1 | 4/2015 | Sako et al. | |
| 2016/0227389 A1 | 7/2016 | Sako et al. | |
| 2017/0034679 A1 | 2/2017 | Sako et al. | |

FOREIGN PATENT DOCUMENTS

| | | |
|---|---|---|
| DE | 101 49 496 A1 | 4/2003 |
| DE | 103 56 475 A1 | 7/2005 |
| EP | 1 331 798 A2 | 7/2003 |
| EP | 1 457 911 A1 | 9/2004 |
| GB | 2 389 742 A | 12/2003 |
| JP | 07-074666 | 3/1995 |
| JP | 2000-201375 A | 7/2000 |
| JP | 2002-169918 | 6/2002 |
| JP | 2002-300296 A | 10/2002 |
| JP | 2003-030361 A | 1/2003 |
| JP | 2004-054340 A | 2/2004 |
| JP | 2004-274658 A | 9/2004 |
| JP | 2004-328308 A | 11/2004 |
| JP | 2005-523622 A | 8/2005 |
| WO | WO 2005/059760 A2 | 6/2005 |

OTHER PUBLICATIONS

U.S. Appl. No. 14/572,678, filed Dec. 16, 2014, Sako et al.
U.S. Appl. No. 15/094,935, filed Apr. 8, 2016, Sako et al.
U.S. Appl. No. 15/293,400, filed Oct. 14, 2016, Sako et al.
European search report dated Feb. 7, 2007 from a corresponding Foreign National Application.
Japanese Office Action dated Mar. 18, 2009 in connection with Japanese Application No. 2005-301720.
Japanese Office Action dated Oct. 6, 2009 in connection with Japanese Application No. 2005-301720.
Extended European Search Report dated Jan. 18, 2019 in connection with European Application No. 18198669.6.

* cited by examiner

COMMUNICATION METHOD AND APPARATUS

CROSS REFERENCES TO RELATED APPLICATIONS

The present application claims the benefit as a continuation under 35 U.S.C. § 120 of U.S. patent application Ser. No. 15/293,400, filed on Oct. 14, 2016 and entitled "COMMUNICATION METHOD AND APPARATUS", which claims the benefit as a continuation under 35 U.S.C. § 120 of U.S. patent application Ser. No. 15/094,935, filed on Apr. 8, 2016 and entitled "COMMUNICATION METHOD AND APPARATUS," now U.S. Pat. No. 9,596,581, which claims the benefit as a continuation under 35 U.S.C. § 120 of U.S. patent application Ser. No. 14/572,678, filed on Dec. 16, 2014 and entitled "COMMUNICATION METHOD AND APPARATUS," now U.S. Pat. No. 9,326,130, which claims the benefit as a divisional under 35 U.S.C. § 120 of U.S. patent application Ser. No. 11/540,696, filed on Sep. 29, 2006 and entitled "COMMUNICATION METHOD AND APPARATUS," now U.S. Pat. No. 9,338,644, which claims priority under 35 U.S.C. § 119 to Japanese Patent Application JP 2005-301720, filed in the Japanese Patent Office on Oct. 17, 2005, each of which is hereby incorporated by reference in its entirety.

BACKGROUND OF THE INVENTION

1. Field of the Invention

The present invention relates to communication apparatuses, such as wireless terminals or cellular phone terminals, and to communication methods performed between communication apparatuses.

2. Description of the Related Art

In social network services (SNS), such as Mixi or Gree, communities constituted by so-called acquaintances of acquaintances (friends of friends) are formed.

Concerning acquaintances of acquaintances, as a matching information retrieval method, a method is described in Japanese Unexamined Patent Application Publication No. 2002-169918. In this method, in order to retrieve information that matches conditions requested by a user from among various types of information stored in a computer system and to provide the retrieved information to the user, a server system retrieves information owned by an acquaintance of the user or owned by an acquaintance of an acquaintance of the user and provides the retrieved information to the user.

However, in the method described in Japanese Unexamined Patent Application Publication No. 2002-169918, although a user is able to acquire information owned by an acquaintance of an acquaintance of the user, the user is not able to directly communicate with the acquaintance of the acquaintance of the user (that is, a person who knows an acquaintance of the user).

For certain purposes, many users want to communicate with other people who are not immediate acquaintances. For example, when people who are not immediately acquainted with each other pass by each other or get close to each other outside home or at travel destinations, if they are able to directly communicate with each other, new encounters and experiences can be realized.

SUMMARY OF THE INVENTION

It is desirable to provide a simple method and apparatus allowing people who are not immediately acquainted with each other to directly and easily communicate with each other.

A communication method according to an embodiment of the present invention includes the steps of transmitting, by means of a first communication apparatus, personal information to a second communication apparatus; receiving, by means of the second communication apparatus, the personal information and searching, by means of the second communication apparatus, whether or not personal information having the same content as the received personal information exists in the second communication apparatus; and notifying, by means of the second communication apparatus, the first communication apparatus of a search result.

According to the communication method configured as described above, for example, when the name or address of an acquaintance of a first user (a user of a first communication apparatus) exists as personal information in the first communication apparatus and the name or address of an acquaintance of a second user (a user of a second communication apparatus) exists as personal information in the second communication apparatus, a result of search of whether or not a mutual (common) acquaintance between the first and second users exists is acquired by the second communication apparatus. When there is a mutual acquaintance between the first and second users, the first and second users are able to directly perform the subsequent communication with each other by requesting the subsequent communication from one of the first and second communication apparatuses to the other one of the first and second communication apparatuses.

In addition, for example, when the name of a company to which the first user belongs or a school to which the first user belonged exists as personal information in the first communication apparatus and a company to which the second user belongs or a school to which the second user belonged exists as personal information in the second communication apparatus, a search result of whether or not the first and second users belong to the same company or whether or not the first and second users belonged to the same school is acquired by the second communication apparatus. When the first and second users belong to the same company or belonged to the same school, the first and second users are able to directly perform the subsequent communication with each other by requesting the subsequent communication from one of the first and second communication apparatuses to the other one of the first and second communication apparatuses.

As described above, users who are not immediately acquainted with each other are able to directly and easily communicate with each other using a simple method and apparatus.

DESCRIPTION OF THE PREFERRED EMBODIMENTS

A first embodiment of the present invention (a case where short-distance wireless communication is performed) will be described with reference to FIGS. 1 to 7.

The outline of a communication apparatus and a communication method will be described with reference to FIG. 1.

Figure 1:
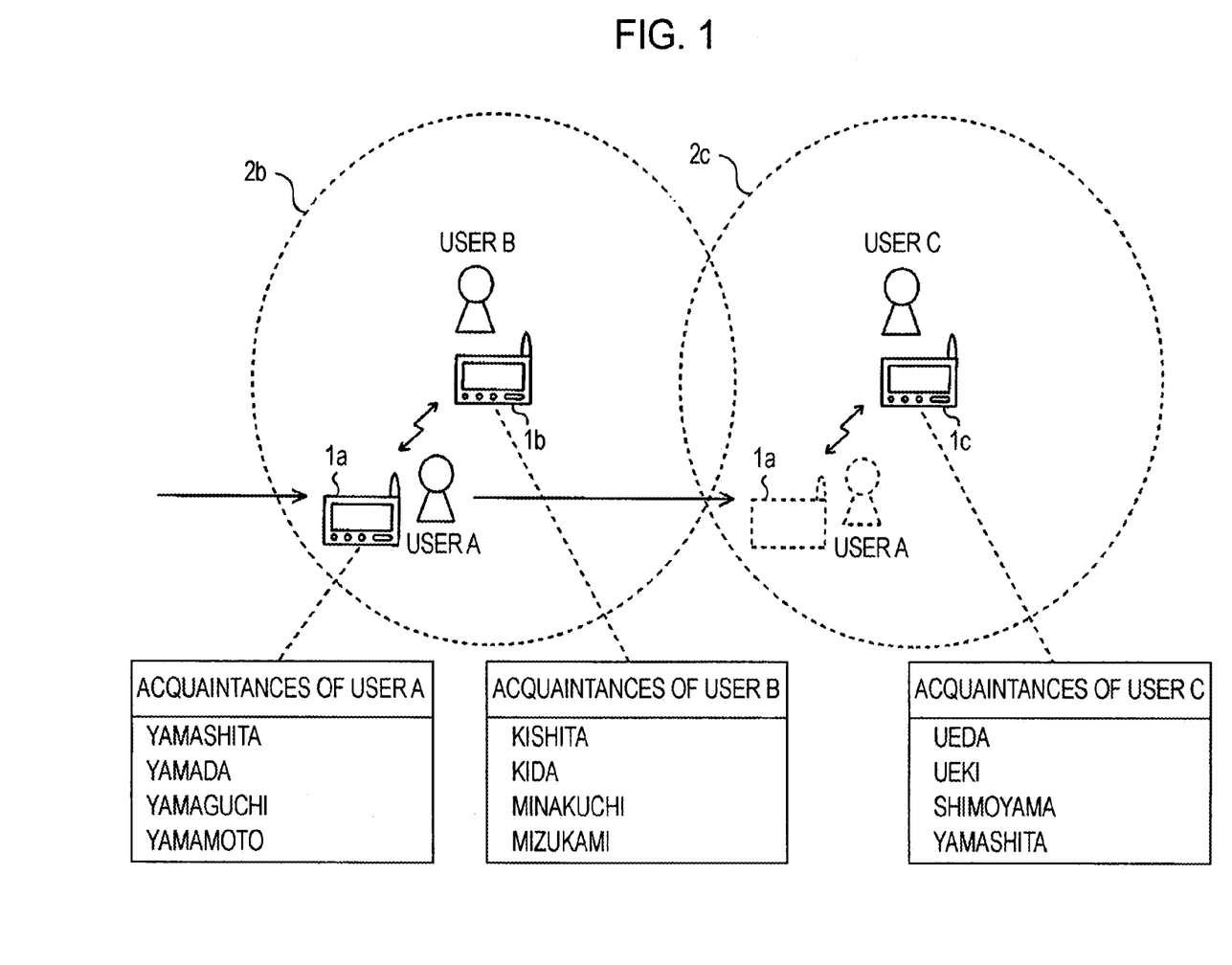
FIG. 1 shows an example of a communication system according to an embodiment of the present invention.

FIG. 1 shows an example of a communication system according to an embodiment of the present invention.

Wireless terminals 1a, 1b, and 1c are capable of directly transferring information between each other within a predetermined distance from each other via wireless communication, such as Ad-hoc communication.

Thus, each of the wireless terminals 1a, 1b, and 1c may serve as a requesting terminal or a responding terminal. In the following descriptions, however, a case where the wireless terminal 1a used by a user A serves as a requesting terminal, wireless terminals 1b and 1c used by users B and C serve as responding terminals, and the wireless terminal 1a requests the wireless terminals 1b and 1c to perform communication will be described.

The wireless terminal 1a holds, as personal information, the names or addresses of acquaintances of the user A in an internal or external storage device. The wireless terminal 1b also holds, as personal information, the names or addresses of acquaintances of the user B in a similar storage device. The wireless terminal 1c also holds, as personal information, the names or addresses of acquaintances of the user C in a similar storage device.

An "acquaintance" represents a friend, a family member, a relative, or a so-called someone who a person knows. A "name" serving as personal information may include a surname and forename, such as "Yamashita Ichiro", may be only a surname, such as "Yamashita", or only a forename, such as "Ichiro". Alternatively, a "name" may be a common name or a nickname. An address serving as personal information is information other than the name, such as a mail address or a telephone number, which identifies a person.

For example, the wireless terminal 1a holds, as the names of acquaintances of the user A, "Yamashita", "Yamada", "Yamaguchi", and "Yamamoto". The wireless terminal 1b holds, as the names of acquaintances of the user B, "Kishita", "Kida", "Minakuchi", and "Mizukami". The wireless terminal 1c holds, as the names of acquaintances of the user C, "Ueda", "Ueki", "Shimoyama", and "Yamashita".

In the system shown in FIG. 1, when the wireless terminal 1a (the user A) enters an area 2b within a predetermined distance from the wireless terminal 1b (the user B), the wireless terminal 1a is capable of transmitting to the wireless terminal 1b the names of the acquaintances of the user A held in the wireless terminal 1a with the recognition of the existence of the wireless terminal 1b. When the wireless terminal 1a (the user A) enters an area 2c within a predetermined distance from the wireless terminal 1c (the user C), the wireless terminal 1a is capable of transmitting to the wireless terminal 1c the names of the acquaintances of the user A held in the wireless terminal 1a with the recognition of the existence of the wireless terminal 1c.

The wireless terminals 1b and 1c each receive the names of the acquaintances of the user A from the wireless terminal 1a, and search whether or not the names exist in the wireless terminals 1b and 1c. Then, the wireless terminals 1b and 1c notify the wireless terminal 1a of results.

In the example shown in FIG. 1, none of the names transmitted from the wireless terminal 1a exists in the wireless terminal 1b. Thus, the wireless terminal 1b transmits to the wireless terminal 1a a message, such as "No mutual acquaintance exists." In contrast, the name "Yamashita", which is transmitted from the wireless terminal 1a, exists in the wireless terminal 1c. Thus, the wireless terminal 1c transmits to the wireless terminal 1a a message, such as "I know Mr./Ms. Yamashita."

The wireless terminal 1a receives the messages from the wireless terminals 1b and 1c, and presents to the user A the details of the messages, that is, search results acquired by the wireless terminals 1b and 1c. Thus, the user A of the wireless terminal 1a is able to know that the user A and the user B of the wireless terminal 1b do not have a mutual acquaintance and that the user A and the user C of the wireless terminal 1c have (or may have) a mutual acquaintance. In accordance with the search results, the user A is able to request the user C to perform communication between the wireless terminals 1a and 1c.

As a specific communication method between the wireless terminal 1a and each of the wireless terminals 1b and 1c, the method described below can be adopted.

An example of a wireless terminal will be described with reference to FIG. 2.

Figure 2:
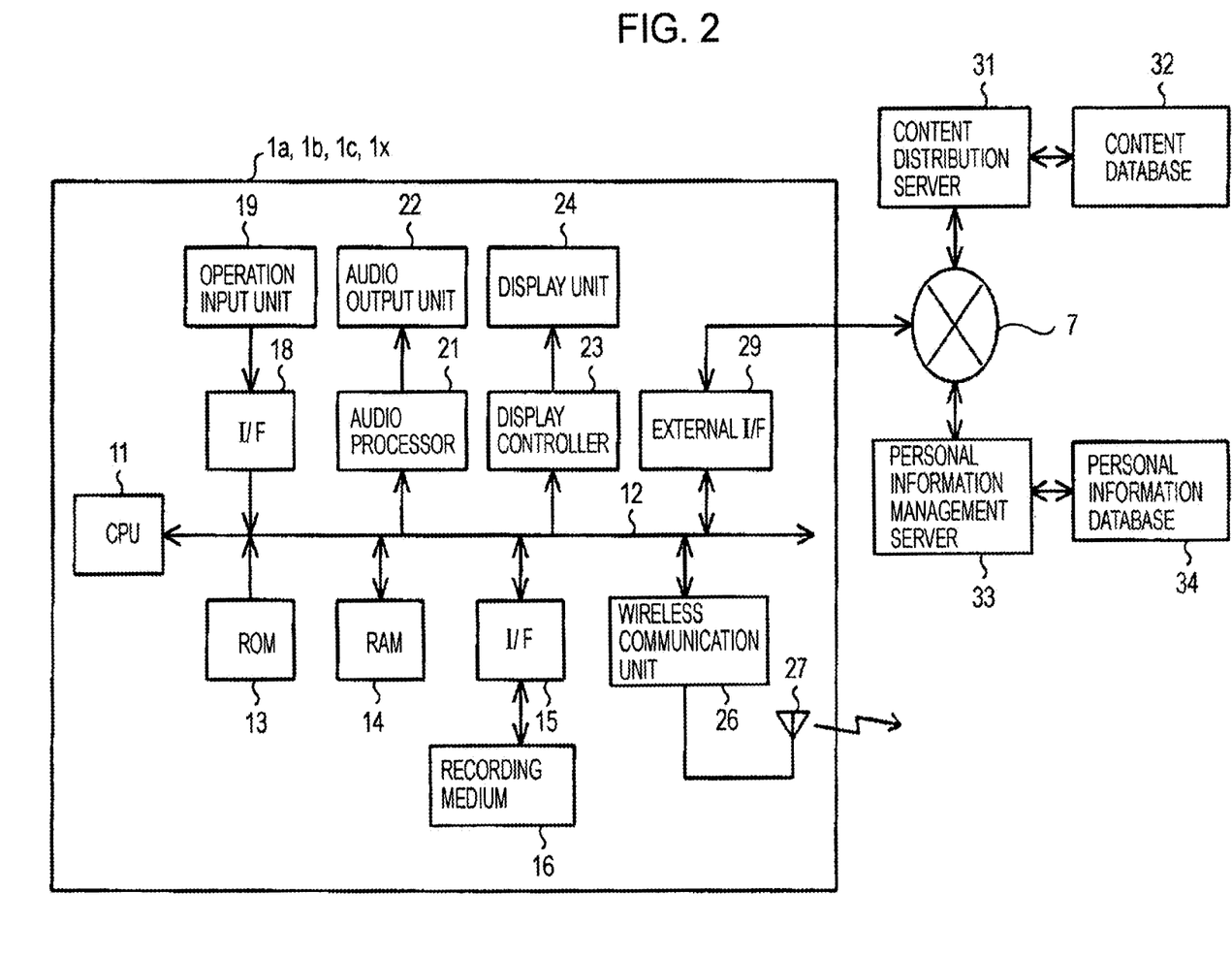
FIG. 2 shows an example of a wireless terminal according to the embodiment.

FIG. 2 shows an example of each of the wireless terminals 1a, 1b, and 1c. The wireless terminals 1a, 1b, and 1c may have the same configuration. In the example shown in FIG. 2, each of the wireless terminals 1a, 1b, and 1c is capable of playing back music.

More specifically, a wireless terminal used in the above-mentioned system, such as each of the wireless terminals 1a, 1b, and 1c, includes a central processing unit (CPU) 11. A read-only memory (ROM) 13 in which a program or data is written and a random-access memory (RAM) 14 to which a program or data is loaded are connected to a bus 12.

In addition, a recording medium 16 is connected to the bus 12 via an interface 15, and an operation input unit 19 is connected to the bus 12 via an interface 18. The recording medium 16 is a hard disk, a flash memory, or the like. An apparatus ID (identifier) that identifies the terminal, a program executable by the CPU 11, music data, other types of data, the above-mentioned personal information, and the like are recorded on the recording medium 16. The operation input unit 19 is provided for a user to perform an operation and input to the terminal.

In addition, an audio output unit 22 including a speaker and a headphone is connected to the bus 12 via an audio processor 21. A display unit 24, such as a liquid crystal display, is connected to the bus 12 via a display controller 23. Playback music and voice announcement is output from the audio output unit 22. A screen used for an operation input or setting, a search result of personal information, a response (permission) to a communication request, and the like are indicated on the display unit 24.

In addition, an antenna 27 is connected to the bus 12 via a wireless communication unit 26, and an external interface 29 for connecting to a network 7, such as the Internet, is connected to the bus 12. The wireless communication unit 26 and the antenna 27 perform the above-mentioned short-distance wireless communication (direct wireless communication within a predetermined distance).

A content distribution server 31 is connected to the network 7. A content database 32 is connected to the content distribution server 31. In response to a request received from the terminal via the network 7, the content distribution server 31 transmits music data stored in the content database 32 to the terminal via the network 7. The transmitted music data is downloaded to the recording medium 16 of the terminal.

A personal information management server 33 is connected to the network 7. A personal information database 34 is connected to the personal information management server 33. In response to a request received from the terminal via the network 7, the personal information management server 33 transmits to the terminal via the network 7 personal information belonging to the user of the terminal and stored in the personal information database 34. The transmitted personal information is recorded on the recording medium 16 or the RAM 14 of the terminal.

That is, in this example, each wireless terminal does not necessarily hold the above-mentioned personal information. When a user intends to communicate with another user via the above-mentioned short-distance wireless communication, the terminal is connected to the personal information management server 33. Thus, the terminal is capable of receiving from the personal information management server 33 personal information deposited in the personal information management server 33 and holding the received personal information in the terminal.

In addition, each wireless terminal used in this example may also have a function of a cellular phone terminal. In this case, personal information is stored in a server of a cellular phone service company or a management service company. Thus, the system may be configured such that, in response to a request received from a terminal via a cellular phone communication network, the server is capable of transmitting via the cellular phone communication network to the terminal personal information belonging to the user of the terminal.

Examples of communication methods will be described with reference to FIGS. 3, 4, 5A, and 5B.

As a communication method or procedure, a method can be adopted in which a requesting terminal transmits to a responding terminal personal information stored in the requesting terminal and queries the responding terminal as to whether or not the same personal information as the personal information transmitted from the requesting terminal exists in the responding terminal and in which, in response to the query, the responding terminal searches whether or not the same personal information as the personal information transmitted from the requesting terminal exists in the responding terminal and notifies the requesting terminal of a search result. This method is called a first method.

Alternatively, another method can be adopted in which a requesting terminal requests a responding terminal to transmit personal information existing in the responding terminal and searches whether or not the same personal information as the personal information transmitted, in response to the request, from the responding terminal exists in the requesting terminal. This method is called a second method.

According to the first method, when the names of a plurality of acquaintances of the user of the requesting terminal exist as personal information in the requesting terminal, the requesting terminal may sequentially transmit the plurality of names to the responding terminal until the requesting terminal receives from the responding terminal a report indicating that the same name as a name transmitted from the requesting terminal exists in the responding terminal. However, the requesting terminal may collectively transmit the plurality of names to the responding terminal so that the responding terminal can perform searching by a single operation.

In addition, according to the second method, when the names of a plurality of acquaintances of the user of the responding terminal exist as personal information in the responding terminal, the responding terminal may sequentially transmit the plurality of names to the requesting terminal until the responding terminal receives from the requesting terminal a report indicating that the same name as a name transmitted from the responding terminal exists in the requesting terminal. However, the responding terminal may collectively transmit the plurality of names to the requesting terminal so that the requesting terminal can perform searching by a single operation.

In addition, the system can be configured such that, when personal information is received from the requesting terminal in the first method or when a request to transmit personal information is received from the requesting terminal in the second method, the responding terminal indicates on the display unit 24 of the responding terminal a message indicating that the personal information is received from the requesting terminal or a message indicating that the request to transmit the personal information is received from the requesting terminal and presents the message to the user of the responding terminal and such that, when the user is not able to accept the subsequent communication or when the user does not want to accept the subsequent communication, the responding terminal is capable of inhibiting searching for personal information or transmission of personal information by disconnecting the communication with the requesting terminal or by transmitting a message indicating that the communication with the requesting terminal is not acceptable in accordance with an operation of the operation input unit 19 of the responding terminal.

Examples of communication processes performed by the wireless terminal 1a serving as the requesting terminal and the wireless terminal 1x serving as the responding terminal in accordance with the first and second methods will be described. The wireless terminal 1x has the same configuration as the wireless terminal 1a shown in FIG. 2. A user X represents a user of the wireless terminal 1x.

A communication process according to the first method will be described with reference to FIGS. 3, 4, 5A, and 5B.

FIGS. 3, 4, 5A, and 5B show an example of the communication process performed by the CPU 11 of each of the wireless terminals 1a and 1x according to the first method.

Figure 3:
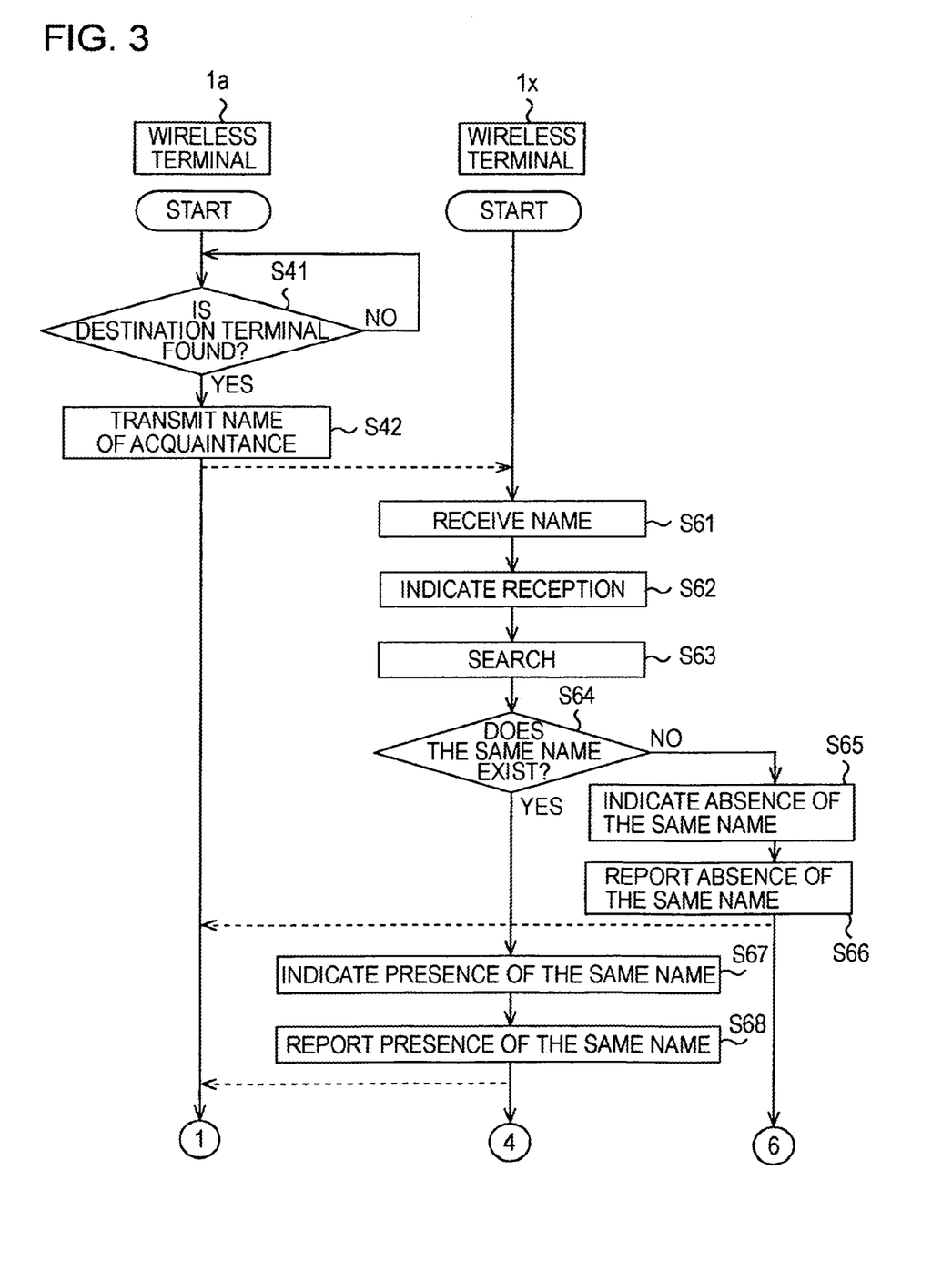
FIG. 3 shows part of an example of a communication process according to a first method.

In the communication process in this example, in a state where each of the wireless terminals 1a and 1x is started up, the wireless terminal 1a determines whether or not a destination terminal is found in step S41. When the wireless terminal 1a enters an area within a predetermined distance from the wireless terminal 1x (or the wireless terminal 1x enters an area within a predetermined distance from the wireless terminal 1a), the wireless terminal 1a finds the wireless terminal 1x as a destination terminal. In step S42, the wireless terminal 1a transmits to the wireless terminal 1x the names of acquaintances of the user A.

Here, the wireless terminal 1a adds a routine message, such as "Is there anyone you know?"

In step S61, the wireless terminal 1x receives the names. In step S62, the wireless terminal 1x indicates a message, such as "There is a request from the user A of the wireless terminal 1a that the user A would like to talk with someone who the user A knows," which indicates that the names are received.

In step S63, the wireless terminal 1x searches whether or not the same name as a name transmitted from the wireless terminal 1a exists in the wireless terminal 1x. In step S64, it is determined whether or not the same name as a name transmitted from the wireless terminal 1a exists in the wireless terminal 1x in accordance with a search result.

If it is determined in step S64 that the same name does not exist, the wireless terminal 1x proceeds to step S65. In step S65, the wireless terminal 1x indicates a message, such as "There is no mutual acquaintance." In step S66, similarly, the wireless terminal 1x notifies the wireless terminal 1a of a message, such as "There is no mutual acquaintance,".

In contrast, if it is determined in step S64 that the same name as a name transmitted from the wireless terminal 1a exists in the wireless terminal 1x, the wireless terminal 1x proceeds to step S67. In step S67, the wireless terminal 1x indicates a message, such as "I have an acquaintance called Mr./Ms. AAA." In step S68, similarly, the wireless terminal 1x notifies the wireless terminal 1a of a massage, such as "I have an acquaintance called Mr./Ms. AAA,".

Figure 4:
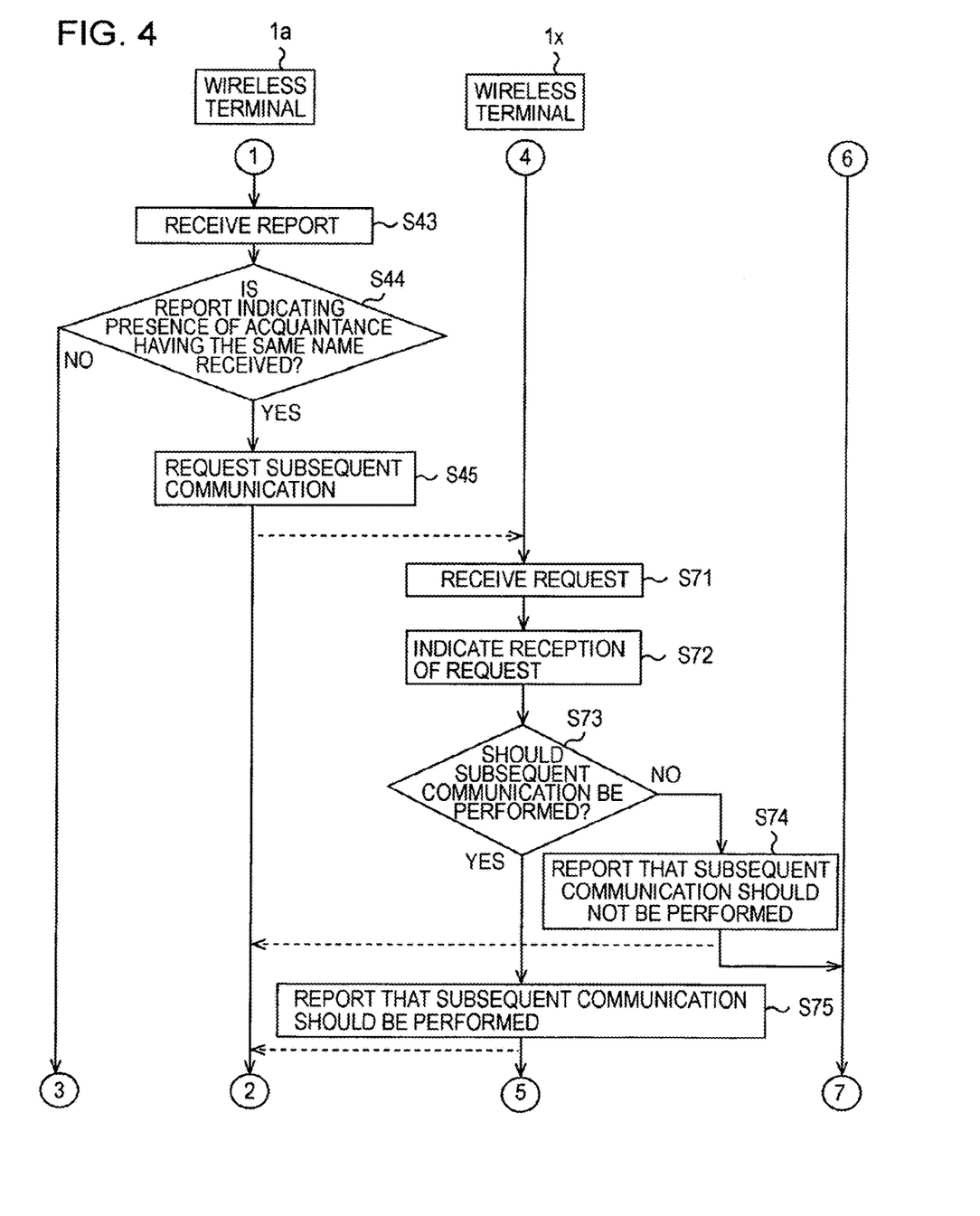
FIG. 4 shows part of the example of the communication process according to the first method.

After transmitting the names of the acquaintances of the user A in step S42, the wireless terminal 1a receives the report from the wireless terminal 1x in step S43. Then, in step S44, the wireless terminal 1a determines whether or not the report indicates presence of an acquaintance having the same name as a name transmitted from the wireless terminal 1a.

If it is determined in step S44 that the report received from the wireless terminal 1x indicates presence of an acquaintance having the same name as a name transmitted from the wireless terminal 1a, the wireless terminal 1a proceeds to step S45. In step S45, the wireless terminal 1a requests the wireless terminal 1x to perform the subsequent communication.

This request is issued by transmitting a routine message, such as "I also know Mr./Ms. AAA. Would you like to talk with me?"

After transmitting the message, such as "I have an acquaintance called Mr./Ms. AAA," to the wireless terminal 1a in step S68, the wireless terminal 1x receives the request from the wireless terminal 1a in step S71. Then, in step S72, the wireless terminal 1x indicates that the request has been received.

The user X instructs the wireless terminal 1x to perform or not to perform the subsequent communication in accordance with an operation of the operation input unit 19 of the wireless terminal 1x.

After indicating the reception of the request in step S72, the wireless terminal 1x determines whether or not to perform the subsequent communication in accordance with an instruction from the user X in step S73. If it is determined in step S73 that the subsequent communication should not be performed, the wireless terminal 1x proceeds to step S74. In step S74, the wireless terminal 1x notifies the wireless terminal 1a that the subsequent communication should not be performed. If it is determined in step S73 that the subsequent communication should be performed, the wireless terminal 1x proceeds to step S75. In step S75, the wireless terminal 1x notifies the wireless terminal 1a that the subsequent communication should be performed.

Figure 5A:
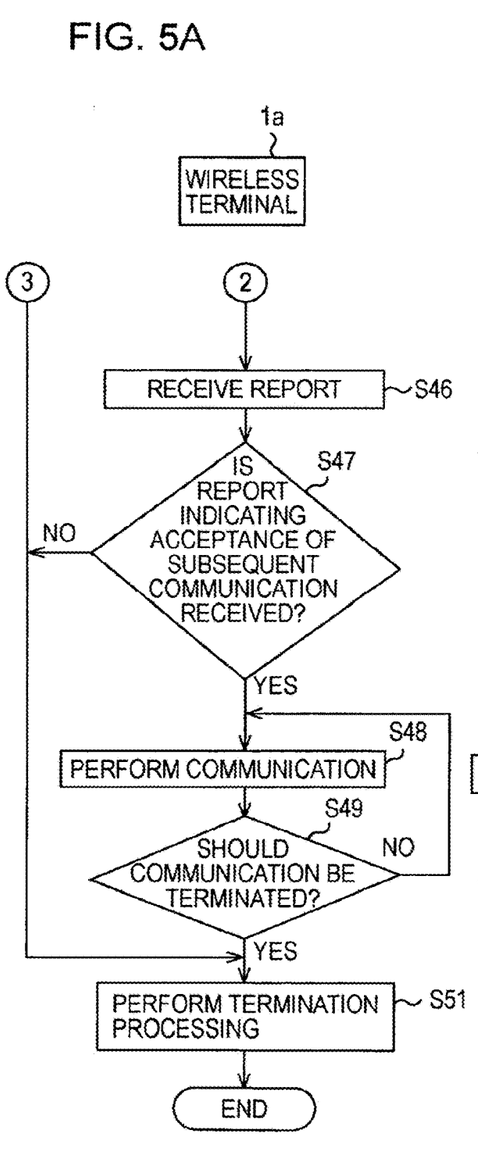
FIGS. 5A and 5B show part of the example of the communication process according to the first method.
Figure 5B:
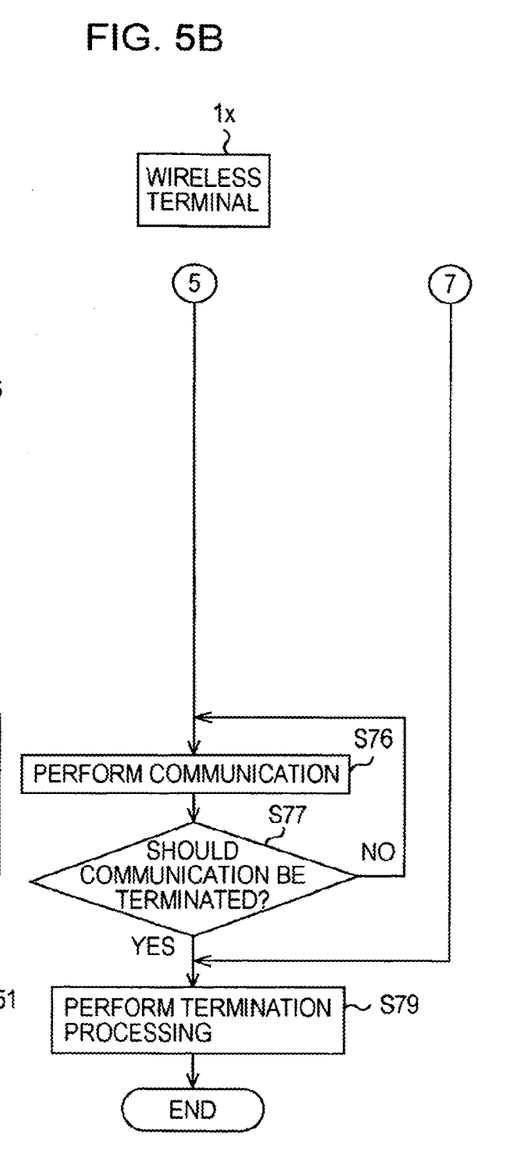

After requesting the wireless terminal 1x to perform the subsequent communication in step S45, the wireless terminal 1a receives the report from the wireless terminal 1x in step S46. Then, in step S47, the wireless terminal 1a determines whether or not the report indicates acceptance of the subsequent communication.

If it is determined in step S47 that the report received from the wireless terminal 1x indicates acceptance of the subsequent communication, the wireless terminal 1a proceeds to step S48. In step S48, the wireless terminal 1a communicates with the wireless terminal 1x. Then, in step S49, the wireless terminal 1a determines whether or not to terminate the communication. If it is determined in step S49 that the communication should not be terminated, the wireless terminal 1a returns to step S48 to continue the communication with the wireless terminal 1x.

In addition, after transmitting the report indicating the acceptance of the subsequent communication in step S75, the wireless terminal 1x proceeds to step S76. In step S76, the wireless terminal 1x communicates with the wireless terminal 1a. Then, in step S77, the wireless terminal 1x determines whether or not to terminate the communication. If it is determined in step S77 that the communication should not be terminated, the wireless terminal 1x returns to step S76 to continue the communication with the wireless terminal 1a.

In the communication between the wireless terminals 1a and 1x in the processing of steps S48 and S76, the users A and X are capable of performing communication, as described later, such as exchange of messages and transmission of music data from one of the wireless terminals 1a and 1x to the other one of the wireless terminals 1a and 1x so that the users of the wireless terminals 1a and 1x can listen to the same music together.

If it is determined in step S49 or step S77 that the communication should be terminated in accordance with a termination operation performed by the user A or the user X, the wireless terminal 1a or 1x performs processing for terminating the communication with the wireless terminal 1x or 1a and then terminates the communication in step S51 or step S79.

When it is determined in step S44 that the report received from the wireless terminal 1x indicates that there is no acquaintance having the same name or when it is determined in step S47 that the report received from the wireless terminal 1x indicates that the subsequent communication should be rejected, the wireless terminal 1a proceeds to step S51. In step S51, after performing processing for terminating the communication with the wireless terminal 1x, the wireless terminal 1a terminates the communication with the wireless terminal 1x.

In addition, after transmitting to the wireless terminal 1a the report indicating that there is no acquaintance having the same name in step S66 or after transmitting to the wireless terminal 1a the report indicating that the subsequent communication should be rejected, the wireless terminal 1x proceeds to step S79. In step S79, after performing processing for terminating the communication with the wireless terminal 1a, the wireless terminal 1x terminates the communication with the wireless terminal 1a.

Although an example of the process performed by the wireless terminals 1a and 1x in accordance with the first method has been described above, each of the wireless terminals 1a and 1x may be configured to perform a process that is different from the above-described process.

For example, each of the wireless terminals 1a and 1x may be configured such that, when the user X instructs termination of communication after the wireless terminal 1x indicates in step S62 that a search request has been received from the wireless terminal 1a, the wireless terminal 1x is capable of terminating the communication with the wireless terminal 1a after reporting to the wireless terminal 1a that the wireless terminal 1x does not accept the request.

In addition, each of the wireless terminals 1a and 1x may be configured such that, even in a case where a report indicating that there is no acquaintance of the same name is received from the wireless terminal 1x, when the user A instructs a request for the subsequent communication, the wireless terminal 1a is capable of requesting the wireless terminal 1x to perform the subsequent communication.

A communication process according to the second method will be described.

In the second method, a process performed by the wireless terminals 1a and 1x is basically the same as the process according to the first method with the exception that, when the wireless terminal 1a, which is a requesting terminal, requests the wireless terminal 1x, which is a responding terminal, to transmit the names of acquaintances of the user X existing in the wireless terminal 1x and the wireless terminal 1x transmits, in response to the request, to the wireless terminal 1a the names of the acquaintances of the user X existing in the wireless terminal 1x, the wireless terminal 1a searches whether or not the same name as a name transmitted from the wireless terminal 1x exists in the wireless terminal 1a and notifies the wireless terminal 1x of a search result.

Communication between users will be described.

In the first method, communication after a request is received (that is, the subsequent communication) performed in steps S48 and S76 in FIGS. 5A and 5B includes exchange of messages, transmission of music data from one of the wireless terminals 1a and 1x to the other one of the wireless terminals 1a and 1x so that users of the wireless terminals 1a and 1x can listen to the same music together, and the like.

When each of the wireless terminals 1a and 1x is provided with a microphone and has a function to transmit voice of a user picked up by the microphone to a destination terminal via the above-mentioned short-distance communication, conversation (talk) can be performed between the users A and X.

Disclosure/nondisclosure of personal information will be described with reference to FIG. 6.

As personal information, apart from the name of an acquaintance of a user, the address of the acquaintance can be used.

Firstly, however, the name and address of an acquaintance of a user is personal information of the acquaintance of the user (that is, the person who the user knows). Thus, in terms of protection of personal information, it is necessary to acquire permission of the acquaintance for disclosure of the name and address of the acquaintance (transmission of the name and address of the acquaintance to another user).

Thus, a user is able to set disclosure or nondisclosure of the name and address of an acquaintance of the user.

Figure 6:
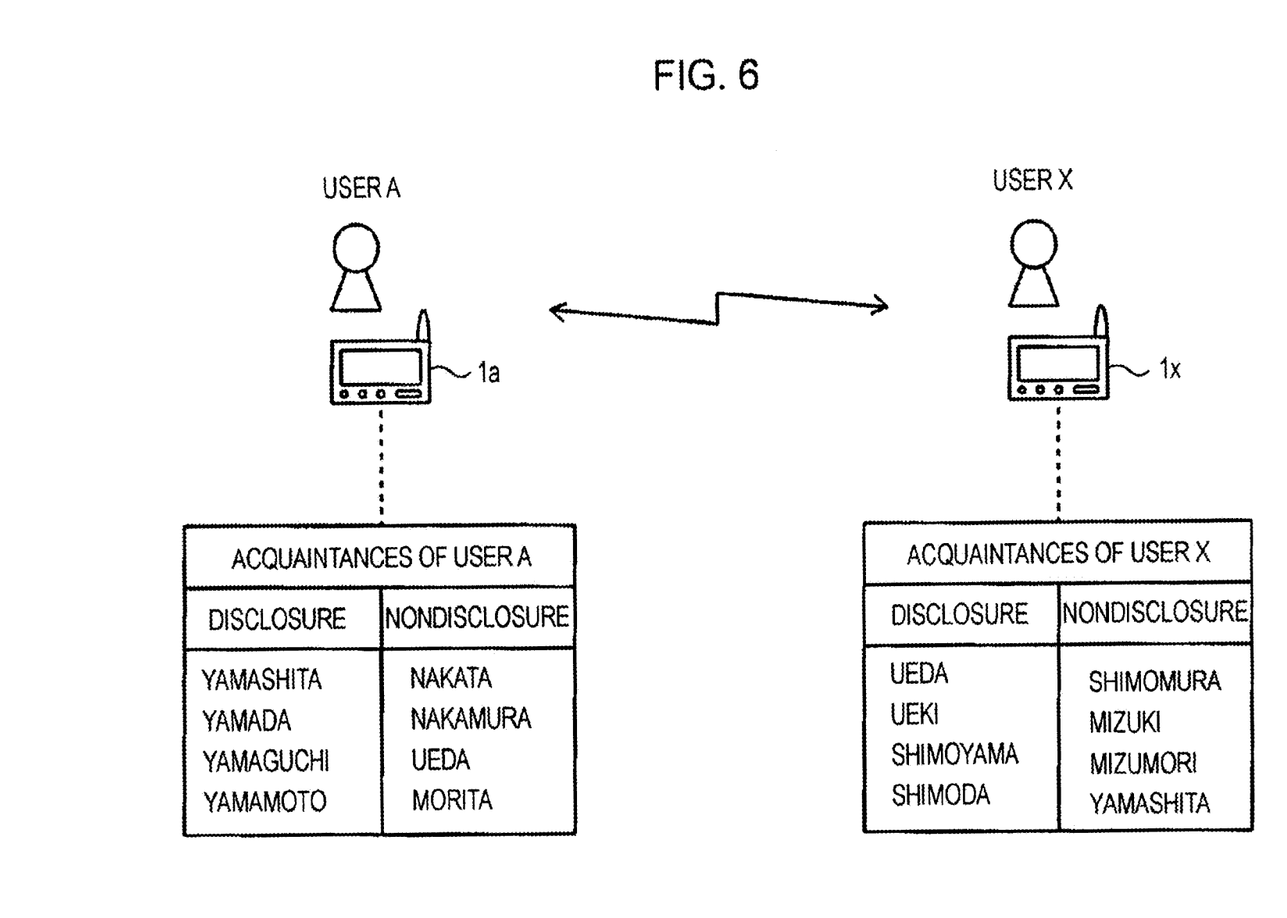
FIG. 6 shows an example of setting of disclosure or nondisclosure.

FIG. 6 shows an example when a user sets disclosure or nondisclosure of personal information. In the example shown in FIG. 6, in the requesting wireless terminal 1a, "Yamashita", "Yamada", "Yamaguchi", and "Yamamoto" exist as disclosable names of acquaintances of the user A, and "Nakata", "Nakamura", "Ueda", and "Morita" exist as non-disclosable names of acquaintances of the user A. In addition, in the responding wireless terminal 1x, "Ueda", "Ueki", "Shimoyama", and "Shimoda" exist as disclosable names of acquaintances of the user X, and "Shimomura", "Muzuki", "Mizumori", and "Yamashita" exist as non-disclosable names of acquaintances of the user X.

In this case, only the names of acquaintances that can be disclosed are transmitted to a destination terminal. More specifically, in the first method, in step S42 in FIG. 3, the wireless terminal 1a transmits to the wireless terminal 1x only the names that can be disclosed (that is, "Yamashita", "Yamada", "Yamaguchi", and "Yamamoto") as the names of acquaintances of the user A. In addition, in the second method, in response to a transmission request from the wireless terminal 1a, the wireless terminal 1x transmits to the wireless terminal 1a only the names that can be disclosed (that is, "Ueda", "Ueki", "Shimoyama", and "Shimoda") as the names of acquaintances of the user X.

In contrast, personal information that is not disclosable can also be included in targets for searching performed by a searching terminal. That is, in the first method, in step S63 in FIG. 3, search is performed for all the names of acquaintances of the user X existing in the wireless terminal 1x. In the second method, search is performed for all the names of acquaintances of the user A existing in the wireless terminal 1a.

Thus, in the example shown in FIG. 6, in the first method, as a name that is equal to one of the names ("Yamashita", "Yamada", "Yamaguchi", and "Yamamoto") transmitted from the wireless terminal 1a, presence of the name "Yamashita", which is not disclosable, is detected in the wireless terminal 1x. In the second method, as a name that is equal to one of the names ("Ueda", "Ueki", "Shimoyama", and "Shimoda") transmitted from the wireless terminal 1x, presence of the name "Ueda", which is not disclosable, is detected in the wireless terminal 1a.

Each wireless terminal may be configured such that, when, in the first method, presence of a name that is not disclosable is detected in the wireless terminal 1x, a message indicating nondisclosure is displayed in step S67 in FIG. 3, and the user X is able to carry out approximate measures, such as rejection of the subsequent communication. In addition, each wireless terminal may be configured such that, when, in the second method, presence of a name that is not disclosable is detected in the wireless terminal 1a, a user is able to perform similar processing.

Personal information is not necessarily limited to the name or address of an acquaintance of a user of a terminal. Information indicating an item relating to the user of the terminal may be used as personal information.

The use of information indicating an item relating to a user of a terminal is not useful for communication between acquaintances of acquaintances. However, the use of information indicating an item relating to a user of a terminal may serve as a trigger of communication between people who are not immediately acquainted with each other, thus facilitating communication.

More specifically, information indicating an item relating to a user is, for example, (a) the name of a company, a school, a group, a section, a municipality, or the like that the user belongs to or belonged to, (b) a hobby or taste of the user, (c) a music category, a singer, or a song the user likes, or the like.

Accordingly, for example, in a case where "Taro" exists in the wireless terminal 1a as the name of a singer the user A likes and "Taro" exists in the wireless terminal 1x as the name of a signer the user X likes, when the users A and X enter an area of a predetermined distance from each other, the fact that both the users A and X like the singer "Taro" brings an opportunity of communication between the users A and X. Thus, the users A and X are capable of communicating with each other.

The degree of similarity of personal information will be described with reference to FIG. 7.

For determination of whether or not personal information existing in a requesting terminal and personal information existing in a responding terminal are equal to each other (or common), it is desirable that, instead of alternatively determining individual personal information as described above, the degree of similarity between the entire personal information existing in the requesting terminal and the entire personal information existing in the responding terminal be detected as a level (value).

Figure 7:
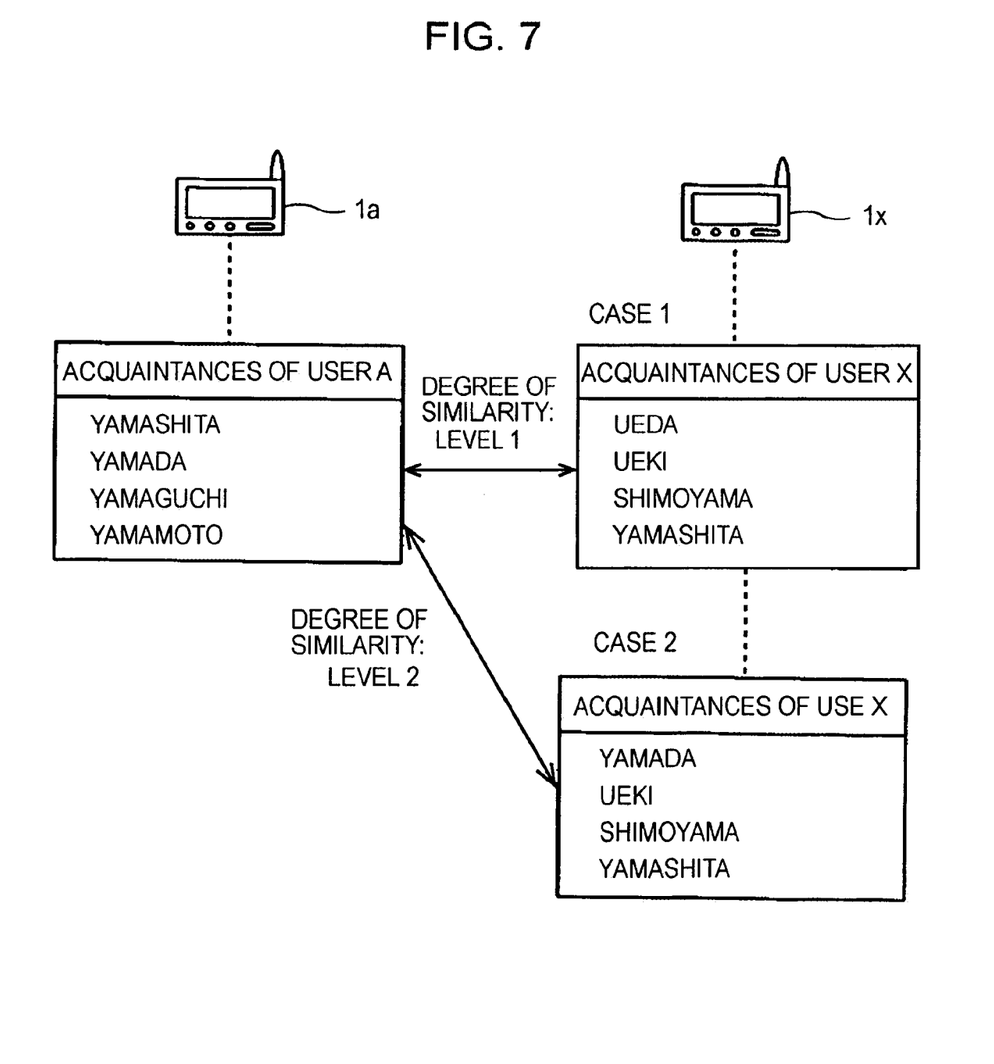
FIG. 7 shows an example of a case where the degree of similarity of personal information is detected.

For example, as shown in FIG. 7, as the names of acquaintances of the user A, names "Yamashita", "Yamada", "Yamaguchi", and "Yamamoto" exist in the requesting wireless terminal 1a. In addition, as the names of acquaintances of the user X, names "Ueda", "Ueki", "Shimoyama", and "Yamashita" exist in the responding wireless terminal 1x, as shown by case 1, or names "Yamada", "Ueki", "Shimoyama", and "Yamashita" exist in the responding wireless terminal 1x, as shown by case 2. In this case, all the above-given names are disclosable.

In case 1, since only the name "Yamashita" exists both in the wireless terminals 1a and 1x, the degree of similarity is set to level 1. In case 2, since the names "Yamada" and "Yamashita" exist both in the wireless terminals 1a and 1x, the degree of similarity is set to level 2.

The degree of similarity detected as described above may be used for selection of whether or not the subsequent communication should be performed and for determination of a target or a mode of the subsequent communication.

For example, each wireless terminal may be configured such that, in the first method, when the degree of similarity is also detected in step S64 in FIG. 3 and the same name exists, the degree of similarity is indicated in step S67 in FIG. 3 or immediately before step S45 in FIG. 4, and such that selection of whether or not to request the subsequent communication can be performed in accordance with the degree of similarity. More specifically, for example, when the degree of similarity is low, such as level 1, the user X rejects the subsequent communication. Alternatively, only when the degree of similarity is high, such as level 2 or more, the user A requests the subsequent communication, and when the degree of similarity is low, such as level 1, the user A does not request the subsequent communication. A similar configuration is applied to the second method.

In addition, each wireless terminal may be configured such that a user instruction is set for the wireless terminal in advance and such that, in the process of communication, the wireless terminal is capable of determining whether or not communication should be continued and whether or not a request is issued in accordance with settings.

A target or a mode of the subsequent communication is changed in accordance with selection or setting performed by a user. More specifically, when the degree of similarity is smaller than a threshold value, a target or a mode of communication is changed, for example, (a) although messages are exchanged, transmission or reception of music data in order to listen to the same music together or conversation (talk) is not performed or (b) although the same music is listened together, only one track is listened, in accordance with the degree of similarity.

A second embodiment of the present invention (a case where communication via a network is performed) will be described with reference to FIG. 8.

As a first example, communication using a cellular phone communication network will be described.

Although a case where a communication apparatus used by a user is a wireless terminal and the communication apparatus communicates with a communication apparatus (wireless terminal) used by another user via short-distance wireless communication is described in the first embodiment, the communication apparatus may be a cellular phone terminal and the communication apparatus may communicate with another communication apparatus (cellular phone terminal) via a cellular phone communication network.

Each of the wireless terminals 1a, 1b, 1c, and 1x shown in FIG. 2 is capable of having a function of a cellular phone terminal in the first embodiment. However, in the first embodiment, communication between users is performed using a short-distance wireless communication function provided in each wireless terminal.

In contrast, in the first example of the second embodiment, a communication apparatus is a cellular phone terminal that does not have a short-distance wireless communication function. Thus, the above-described communication between users is performed using a cellular phone communication network.

In this case, even when a user of a requesting cellular phone terminal does not know a user of a responding cellular phone terminal, if the user of the requesting cellular phone terminal knows the address of the responding cellular phone terminal, the requesting cellular phone terminal is capable of being connected to the responding cellular phone terminal via a cellular phone communication network. Thus, the user of the requesting cellular phone terminal is capable of performing the above-described communication with the user of the responding cellular phone terminal.

As a second example, communication using the Internet will be described.

As the second example of communication using a network, a communication apparatus used by a user may have a function to be connected to the Internet and the communication apparatus may communicate with a communication apparatus of another user via the Internet.

Figure 8:
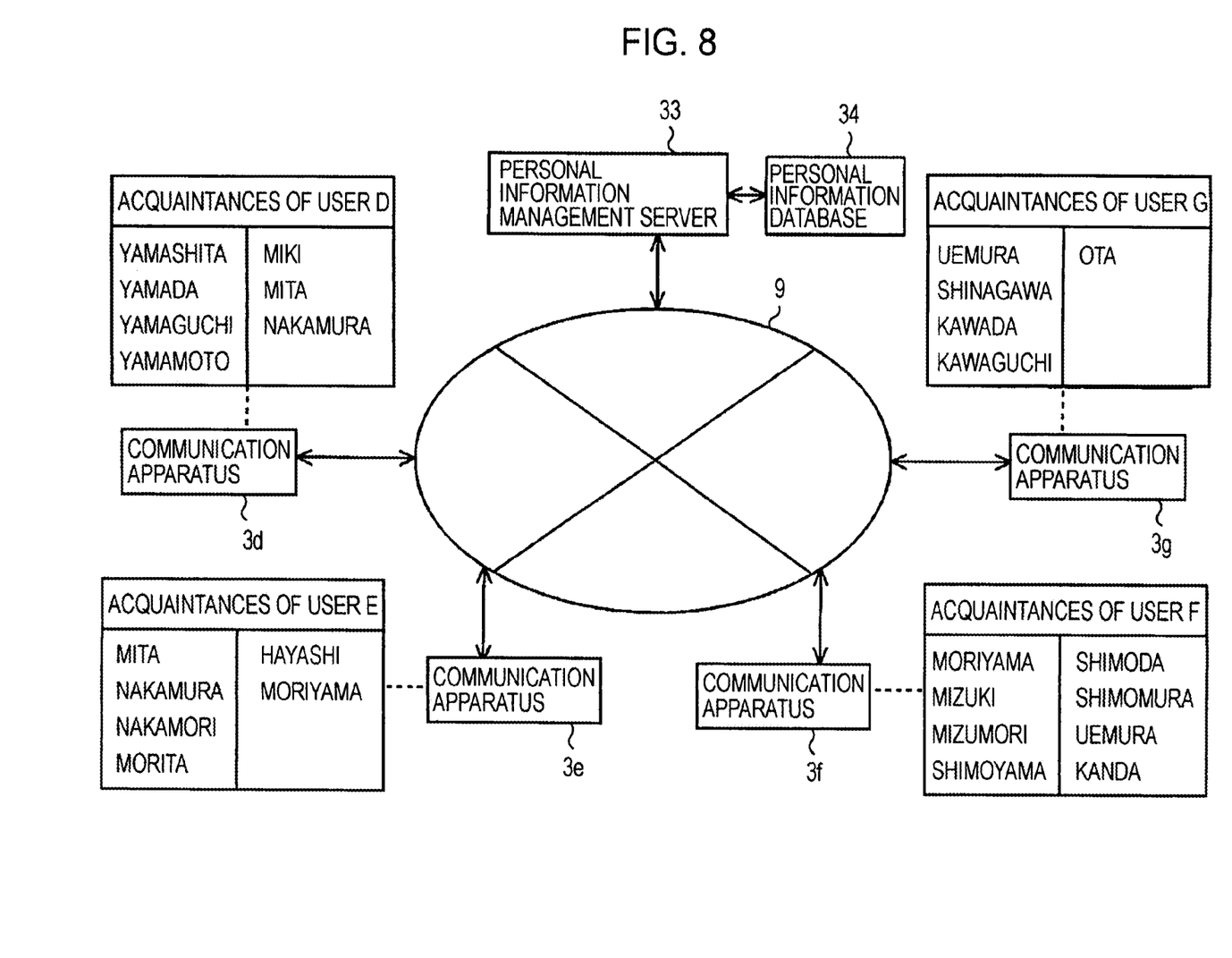
FIG. 8 shows an example of a system when communication is performed via a network.

FIG. 8 shows an example of a system in this case. Communication apparatuses 3d, 3e, 3f, and 3g used by the users D, E, F, and G are connected to the Internet 9. In addition, the personal information management server 33 is connected to the Internet 9. The personal information database 34 is connected to the personal information management server 33.

Names "Yamashita", "Yamada", "Yamaguchi", "Yamamoto", "Miki", "Mita", and "Nakamura" exist as the names of acquaintances of the user D in the communication apparatus 3d. Names "Mita", "Nakamura", "Nakamori", "Morita", "Hayashi", and "Moriyama" exist as the names of acquaintances of the user E in the communication apparatus 3e. Names "Moriyama", "Mizuki", "Mizumori", "Shimoyama", "Shimoda", "Shimomura", "Uemura", and "Kanda" exist as the names of acquaintances of the user F in the communication apparatus 3f. Names "Uemura", "Shinagawa", "Kawada", "Kawaguchi", and "Ota" exist as the names of acquaintances of the user G in the communication apparatus 3g.

These names are not necessarily recorded on a communication apparatus used by a user. The communication apparatus is capable of acquiring these names from the personal information management server 33 when the communication apparatus is connected to another communication apparatus to transmit names existing in the communication apparatus to the other communication apparatus, when the other communication apparatus requests the communication apparatus to transmit names existing in the communication apparatus, or when the communication apparatus searches whether or not the same name as a name transmitted from the other communication apparatus exists in the communication apparatus.

In the example shown in FIG. 8, "Mita" and "Nakamura" are mutual acquaintances between the users D and E, "Moriyama" is a mutual acquaintance between the users E and F, and "Uemura" is a mutual acquaintance between the users F and G. However, there is no mutual acquaintance between the users D and F, between the users D and G, or between the users E and G.

In this case, for example, even when the user D does not know the user E, if the user D knows the address of the communication apparatus 3e used by the user E, the communication apparatus 3d is capable of being connected to the communication apparatus 3e used by the user E. Thus, the user D is able to perform the above-described communication with the user E.

It should be understood by those skilled in the art that various modifications, combinations, sub-combinations and alterations may occur depending on design requirements and other factors insofar as they are within the scope of the appended claims or the equivalents thereof.

What is claimed is:

1. A server comprising:
    at least one memory configured to store a personal information database and instructions, wherein the personal information database stores at least first personal information regarding a first user and second personal information regarding a second user; and
    at least one processor configured to execute the instructions to:
        retrieve, from the personal information database, the first personal information regarding the first user and the second personal information regarding the second user, the first personal information including a first permission decision from the first user regarding disclosure of the first personal information, the second personal information including a second permission decision from the second user regarding disclosure of the second personal information;
        determine, based at least in part on the first personal information and the second personal information, a similarity between the first user and the second user;
        determine whether to notify a first device of the first user of a name of the second user based upon the determined similarity between the first user and the second user and at least one of the first permission decision and the second permission decision;
        receive, from the first device of the first user, an instruction not to perform a subsequent communication with a second device of the second user; and
        terminate the subsequent communication with the second device of the second user.

2. The device of claim 1, wherein the first personal information includes a name of a company to which the first user previously belonged or currently belongs, and the second personal information includes a name of a company to which the second user previously belonged or currently belongs.

3. The device of claim 1, wherein the first personal information includes a name of music liked by the first user, and the second personal information includes a name of music liked by the second user.

4. The device of claim 3, wherein the name of music liked by the first user comprises a name of a singer liked by the first user, and the name of music liked by the second user comprises a name of a singer liked by the second user.

5. The device of claim 1, wherein the subsequent communication includes an exchange of text messaging between the first device of the first user and the second device of the second user.

6. The device of claim 1, wherein the subsequent communication includes a voice conversation between the first device of the first user and the second device of the second user.

7. The device of claim 1, wherein the subsequent communication includes same content data shared between the first device of the first user and the second device of the second user.

8. A non-transitory computer readable storage medium having stored thereon instructions that, when executed by a processor, perform a method comprising:
    retrieving, from a personal information database storing at least first personal information regarding a first user and second personal information regarding a second user, the first personal information regarding the first user and the second personal information regarding the second user, the first personal information including a first permission decision from the first user regarding disclosure of the first personal information, the second personal information including a second permission decision from the second user regarding disclosure of the second personal information;
    determining, based at least in part on the first personal information and the second personal information, a similarity between the first user and the second user;
    determining whether to notify a first device of the first user of a name of the second user based upon the determined similarity between the first user and the second user and at least one of the first permission decision and the second permission decision;
    receiving, from the first device of the first user, an instruction not to perform a subsequent communication with a second device of the second user; and
    terminate the subsequent communication with the second device of the second user.

9. The non-transitory computer readable storage medium of claim 8, wherein the first personal information includes a name of a company to which the first user previously belonged or currently belongs, and the second personal information includes a name of a company to which the second user previously belonged or currently belongs.

10. The non-transitory computer readable storage medium of claim 8, wherein the first personal information includes a name of music liked by the first user, and the second personal information includes a name of music liked by the second user.

11. The non-transitory computer readable storage medium of claim 10, wherein the name of music liked by the first user comprises a name of a singer liked by the first user, and the name of music liked by the second user comprises a name of a singer liked by the second user.

12. The non-transitory computer readable storage medium of claim 8, wherein the subsequent communication includes an exchange of text messaging between the first device of the first user and the second device of the second user.

13. The non-transitory computer readable storage medium of claim 8, wherein the subsequent communication includes a voice conversation between the first device of the first user and the second device of the second user.

14. The non-transitory computer readable storage medium of claim 8, wherein the subsequent communication includes same content data shared between the first device of the first user and the second device of the second user.

15. A method comprising:
    retrieving, from a personal information database storing at least first personal information regarding a first user and second personal information regarding a second user, the first personal information regarding the first user and the second personal information regarding the second user, the first personal information including a first permission decision from the first user regarding disclosure of the first personal information, the second personal information including a second permission decision from the second user regarding disclosure of the second personal information a;

determining, based at least in part on the first personal information and the second personal information, a similarity between the first user and the second user;

determining whether to notify a first device of the first user of a name of the second user based upon the determined similarity between the first user and the second user and at least one of the first permission decision and the second permission decision;

receiving, from the first device of the first user, an instruction not to perform a subsequent communication with a second device of the second user; and terminate the subsequent communication with the second device of the second user.

16. The method of claim 15, wherein the first personal information includes a name of a company to which the first user previously belonged or currently belongs, and the second personal information includes a name of a company to which the second user previously belonged or currently belongs.

17. The method of claim 15, wherein the first personal information includes a name of music liked by the first user, and the second personal information includes a name of music liked by the second user.

18. The method of claim 17, wherein the name of music liked by the first user comprises a name of a singer liked by the first user, and the name of music liked by the second user comprises a name of a singer liked by the second user.

19. The method of claim 15, wherein the subsequent communication includes an exchange of text messaging between the first device of the first user and the second device of the second user.

20. The method of claim 15, wherein the subsequent communication includes a voice conversation between the first device of the first user and the second device of the second user.

21. The method of claim 15, wherein the subsequent communication includes same content data shared between the first device of the first user and the second device of the second user.

22. A non-transitory computer readable storage medium having stored thereon instructions that, when executed by a processor of a first device of a first user, perform a method comprising:

receiving a name of a second user based on a similarity between the first user and the second user, wherein:
the similarity between the first user and the second user is determined based at least in part on first personal information regarding the first user and second personal information regarding the second user stored in a personal information database stored in at least one memory connected to a personal information server, the first personal information including a first permission decision from the first user regarding disclosure of the first personal information, the second personal information including a second permission decision from the second user regarding disclosure of the second personal information; and controlling to transmit, from the first device of the first user to a second device of the second user, an instruction not to perform a subsequent communication with the second device of the second user.

23. The non-transitory computer readable storage medium of claim 22, wherein the first personal information includes a name of a company to which the first user previously belonged or currently belongs, and the second personal information includes a name of a company to which the second user previously belonged or currently belongs.

24. The non-transitory computer readable storage medium of claim 22, wherein the first personal information includes a name of music liked by the first user, and the second personal information includes a name of music liked by the second user.

25. The non-transitory computer readable storage medium of claim 24, wherein the name of music liked by the first user comprises a name of a singer liked by the first user, and the name of music liked by the second user comprises a name of a singer liked by the second user.

26. The non-transitory computer readable storage medium of claim 22, wherein the instruction includes a predetermined text message.

27. The non-transitory computer readable storage medium of claim 22, wherein the subsequent communication includes an exchange of text messaging between the first device of the first user and the second device of the second user.

28. The non-transitory computer readable storage medium of claim 22, wherein the subsequent communication includes same content data shared between the first device of the first user and the second device of the second user.

29. A method comprising:

receiving a name of a second user based on a similarity between a first user and the second user, wherein:
the similarity between the first user and the second user is determined based at least in part on first personal information regarding the first user and second personal information regarding the second user stored in a personal information database stored in at least one memory connected to a personal information server, the first personal information including a first permission decision from the first user regarding disclosure of the first personal information, the second personal information a second permission decision from the second user regarding disclosure of the second personal information; and controlling to transmit, from the first device of the first user to a second device of the second user, an instruction not to perform a subsequent communication with the second device of the second user.

30. The method of claim 29, wherein the first personal information includes a name of a company to which the first user previously belonged or currently belongs, and the second personal information includes a name of a company to which the second user previously belonged or currently belongs.

31. The method of claim 29, wherein the first personal information includes a name of music liked by the first user, and the second personal information includes a name of music liked by the second user.

32. The method of claim 31, wherein the name of music liked by the first user comprises a name of a singer liked by the first user, and the name of music liked by the second user comprises a name of a singer liked by the second user.

33. The method of claim 29, wherein the instruction includes a predetermined text message.

* * * * *